(12) United States Patent
Utgikar

(10) Patent No.: US 9,774,504 B2
(45) Date of Patent: Sep. 26, 2017

(54) ROUTE REFRESH MECHANISM FOR BORDER GATEWAY PROTOCOL LINK STATE

(71) Applicant: Telefonaktiebolaget LM Ericsson (publ), Stockholm (SE)

(72) Inventor: Anant P. Utgikar, San Jose, CA (US)

( * ) Notice: Subject to any disclaimer, the term of this patent is extended or adjusted under 35 U.S.C. 154(b) by 134 days.

(21) Appl. No.: 15/008,384

(22) Filed: Jan. 27, 2016

(65) Prior Publication Data

US 2017/0093641 A1    Mar. 30, 2017

Related U.S. Application Data

(60) Provisional application No. 62/235,398, filed on Sep. 30, 2015.

(51) Int. Cl.
*H04L 12/24*    (2006.01)
*H04L 12/751*   (2013.01)
*H04L 12/715*   (2013.01)

(52) U.S. Cl.
CPC .............. *H04L 41/12* (2013.01); *H04L 45/02* (2013.01); *H04L 45/04* (2013.01)

(58) Field of Classification Search
CPC .......... H04L 45/02; H04L 45/04; H04L 41/12
See application file for complete search history.

(56) References Cited

U.S. PATENT DOCUMENTS

| | | | | |
|---|---|---|---|---|
| 7,787,396 B1 * | 8/2010 | Nalawade | ............... | H04L 45/02 370/254 |
| 9,106,530 B1 * | 8/2015 | Wang | ...................... | H04L 41/12 |
| 2006/0198322 A1 * | 9/2006 | Hares | ....................... | H04L 45/02 370/254 |
| 2006/0233182 A1 * | 10/2006 | Appanna | ................. | H04L 45/04 370/401 |
| 2007/0064698 A1 * | 3/2007 | Appanna | ................. | H04L 45/00 370/392 |
| 2009/0274159 A1 * | 11/2009 | Xia | ......................... | H04L 45/02 370/401 |

(Continued)

OTHER PUBLICATIONS

RFC 5291: Chen, et al., "Outbound Route Filtering Capability for BGP-4," Internet Engineering Task force, The Internet Society, Aug. 2008, 12 pages.

(Continued)

*Primary Examiner* — Hoang-Chuong Vu

(57) ABSTRACT

A method is implemented by a network device acting as a border gateway protocol (BGP) speaker in a network including a plurality of network devices. The method implements selective route refresh for BGP link state (BGP-LS) to reduce communication overhead in sharing network topology information with other BGP speakers in the network. The method includes receiving an advanced route refresh message from a peer BGP speaker, where the advanced route refresh message includes an address family identifier (AFI), a subsequent address family identifier (SAFI), and one or more parameters associated with the AFI and the SAFI. The method further includes determining a subset of network topology information that matches the AFI, the SAFI, and the one or more parameters in the received advanced route refresh message and transmitting the subset of network topology information to the peer BGP speaker.

17 Claims, 8 Drawing Sheets

(56) References Cited

U.S. PATENT DOCUMENTS

2012/0269198 A1* 10/2012 Patel .................. H04L 45/021 370/400
2013/0117449 A1* 5/2013 Hares .................. H04L 29/06 709/225

OTHER PUBLICATIONS

Utgikar, "Selective Route Refresh for BGP; draft-utgikar-serr-00," Internet Engineering Task Force (IETF), Standard Working Draft, The Internet Society, Nov. 2015, 9 pages.

RFC 1771: Rekhter, et al., "A Border Gateway Protocol 4 (BGP-4)", Network Working Group, Request for comments, Mar. 1995, 57 pages.

RFC 2842: Chandra, et al., "Capabilities Advertisement with BGP-4", Network Working Group, Request for comments, The Internet Society, May 2000, 5 pages.

RFC 2858: Bates, et al., "Multiprotocol Extensions for BGP-4", Network Working Group, Request for Comments, The Internet Society, Jun. 2000, 11 pages.

RFC 2918: Chen, "Route Refresh Capability for BGP-4", Network Working Group, Request for Comments, The Internet Society, Sep. 2000, 4 pages.

RFC 4364: Rosen, et al., "BGP/MPLS IP Virtual Private Networks (VPNs)," Network Working Group, Request for comments, The Internet Society, Feb. 2006, 47 pages.

RFC 7313: Patel, et al., "Enhanced Route Refresh Capability for BGP-4", Internet Engineering Task Force (IETF), Request for Comments, IETF Trust, Jul. 2014, 8 pages.

Gredler, et al., "North-Bound Distribution of Link-State and TE Information using BGP", draft-ieff-idr-ls-distribution-11, Internet Engineering Task Force (IETF), Inter-Domain Routing, Internet-Draft, IETF Trust, Jun. 4, 2015, 45 pages.

* cited by examiner

```
 0                   7                  15                  23                  31
 +-------------------+-------------------+-------------------+-------------------+
 |    NLRI Type      |
 +-------------------+-------------------+
```

```
 +-------+--------------------------------+
 | Type  |    NLRI Type                   |
 +-------+--------------------------------+
 |   1   | Node NLRI                      |
 |   2   | Link NLRI                      |
 |   3   | IPv4 Topology Prefix NLRI      |
 |   4   | IPv6 Topology Prefix NLRI      |
 +-------+--------------------------------+
```

FIG. 2D

```
 0                   7                  15                  23                  31
 +-------------------+-------------------+-------------------+-------------------+
 |                            Route Distinguisher                                |
 +-------------------+-------------------+-------------------+-------------------+
 |    Length         |
 +-------------------+-------------------+-------------------+-------------------+
 //           SAFI-71 Set identifiers                                           //
 |                  (variable)                                                   |
 +-------------------+-------------------+-------------------+-------------------+
```

FIG. 2E

ROUTE REFRESH MECHANISM FOR BORDER GATEWAY PROTOCOL LINK STATE

CROSS-REFERENCE TO RELATED APPLICATIONS

This application claims the benefit of U.S. Provisional Application No. 62/235,398, filed Sep. 30, 2015, which is hereby incorporated by reference.

FIELD

Embodiments of the invention relate to the field of computer networks, and more specifically, to a route refresh mechanism for border gateway protocol link state (BGP-LS).

BACKGROUND

Border gateway protocol (BGP) is a protocol for exchanging routing and reachability information between autonomous systems (ASes). An AS is a set of routers under a single technical administration. An AS typically employs an interior gateway protocol (IGP) to exchange network topology information among routers within the AS. An AS may employ more than one IGP and in some cases more than one instance of a given IGP.

Border gateway protocol link state (BGP-LS) uses BGP as a carrier for network topology information collected by an IGP. BGP-LS allows a BGP speaker to share network topology information collected by the BGP speaker (e.g., network topology information collected using an IGP) with external components (e.g., another BGP speaker located in another AS) using BGP. BGP-LS defines a link-state network layer reachability information (NLRI) encoding format that is used to share network topology information with external components. Each link-state NLRI describes either a node, a link, or a prefix. Network topology information is aggregated based on AS number, link state identifier (LS-ID), protocol, instance identifier, and NLRI type.

BGP route refresh capability allows a BGP speaker to dynamically request a re-advertisement of network topology information from a BGP peer. A BGP ROUTE-REFRESH message is encoded as:

```
 0       7      15     23     31
+-------+-------+-------+-------+
|  AFI  | Res.  | SAFI  |
+-------+-------+-------+-------+
```

Performing a route refresh using the existing ROUTE-REFRESH message triggers a refresh on an entire address family identifier (AFI) and subsequent address family identifier (SAFI) specified in the message. This causes a refresh of all network topology information for a given AFI and SAFI, which may result in unnecessary churn and communication overhead.

SUMMARY

A method is implemented by a network device acting as a border gateway protocol (BGP) speaker in a network including a plurality of network devices. The method implements selective route refresh for BGP link state (BGP-LS) to reduce communication overhead in sharing network topology information with other BGP speakers in the network. The method includes receiving an advanced route refresh message from a peer BGP speaker, where the advanced route refresh message includes an address family identifier (AFI), a subsequent address family identifier (SAFI), and one or more parameters associated with the AFI and the SAFI. The method further includes determining a subset of network topology information that matches the AFI, the SAFI, and the one or more parameters in the received advanced route refresh message and transmitting the subset of network topology information to the peer BGP speaker.

A network device is configured to act as a border gateway protocol (BGP) speaker in a network including a plurality of network devices and to implement selective route refresh for BGP link state (BGP-LS) to reduce communication overhead in sharing network topology information with other BGP speakers in the network. The network device includes a non-transitory machine-readable storage medium having stored therein a BGP advanced route refresh component and a set of one or more processors coupled to the non-transitory machine-readable storage medium. The set of one or more processors configured to execute the BGP advanced route refresh component. The BGP advanced route refresh component is configured to receive an advanced route refresh message from a peer BGP speaker, where the advanced route refresh message includes an address family identifier (AFI), a subsequent address family identifier (SAFI), and one or more parameters associated with the AFI and the SAFI. The BGP advanced route refresh component is further configured to determine a subset of network topology information that matches the AFI, the SAFI, and the one or more parameters in the received advanced route refresh message and transmit the subset of network topology information to the peer BGP speaker.

A non-transitory computer readable medium has computer code stored therein that is to be executed by a set of one or more processors of a network device acting as a border gateway protocol (BGP) speaker in a network. The computer code, when executed by the set of one or more processors of the network device causes the network device to perform operations for implementing selective route refresh for BGP link state (BGP-LS) to reduce communication overhead in sharing network topology information with other BGP speakers in the network. The operations include receiving an advanced route refresh message from a peer BGP speaker, where the advanced route refresh message includes an address family identifier (AFI), a subsequent address family identifier (SAFI), and one or more parameters associated with the AFI and the SAFI. The operations further include determining a subset of network topology information that matches the AFI, the SAFI, and the one or more parameters in the received advanced route refresh message and transmitting the subset of network topology information to the peer BGP speaker.

BRIEF DESCRIPTION OF THE DRAWINGS

The invention may best be understood by referring to the following description and accompanying drawings that are used to illustrate embodiments of the invention. In the drawings:

FIG. 2D illustrates a format for an NLRI identifier and possible values for NLRI type, according to some embodiments.

FIG. 2E illustrates a format for a SAFI-VPN set identifier, according to some embodiments.

DESCRIPTION OF EMBODIMENTS

Figure 1:
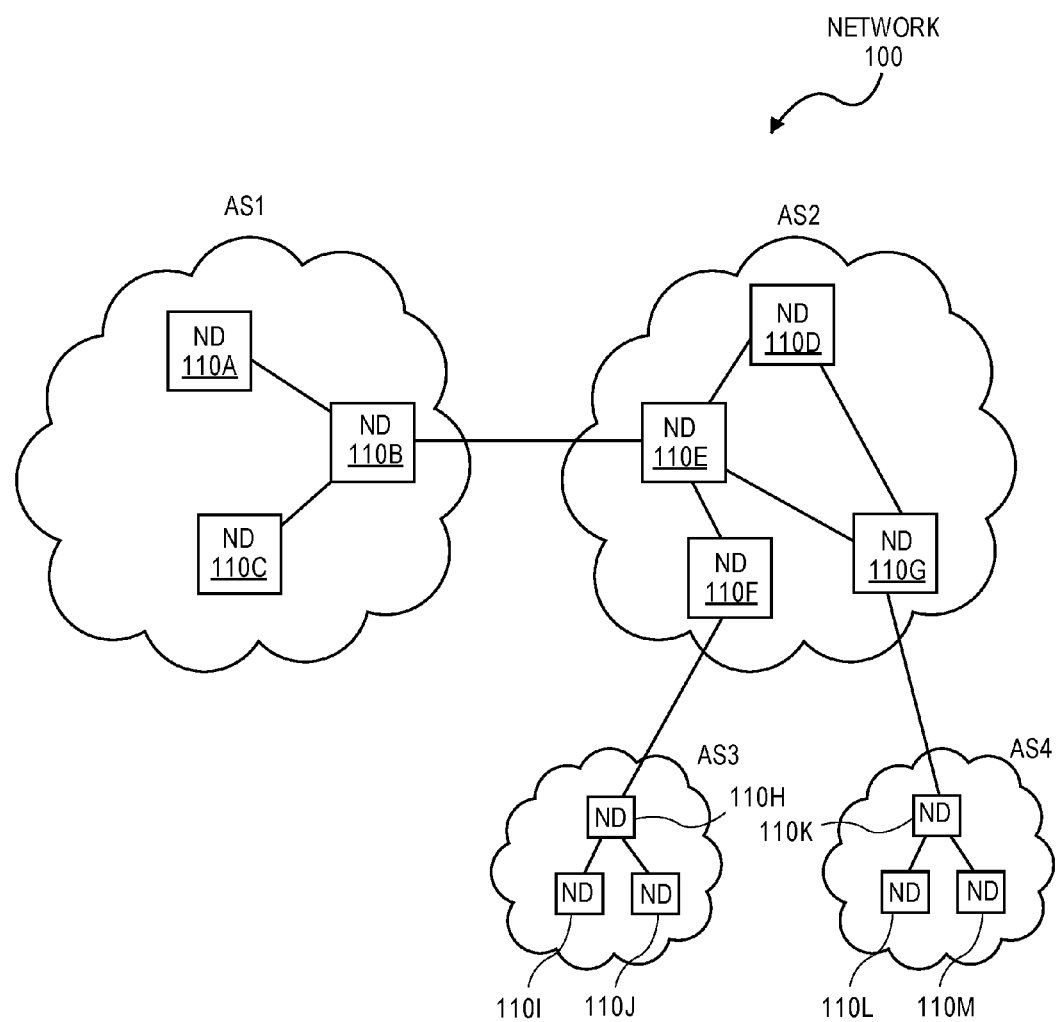
FIG. 1 is a block diagram illustrating a network in which selective route refresh for BGP-LS can be implemented, according to some embodiments.

The following description describes methods and apparatus for selective route refresh in border gateway protocol link state (BGP-LS) to reduce communication overhead in sharing network topology information with other border gateway protocol (BGP) speakers. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

BGP route refresh capability allows a BGP speaker to dynamically request a re-advertisement of network topology information from a BGP peer. A BGP speaker can request a BGP route refresh by transmitting a BGP ROUTE-REFRESH message to a peer BGP speaker. A BGP ROUTE-REFRESH message allows the BGP speaker to refresh network topology information for a given address family identifier (AFI) and subsequent address family identifier (SAFI). In BGP-LS, non-VPN link, node, and prefix information is encoded using AFI 16388/SAFI 71. VPN link, node, and prefix information is encoded using AFI 16388/SAFI TBD. As such, performing a route refresh in BGP-LS using the existing ROUTE-REFRESH message will refresh all network topology information for a given AFI and SAFI (e.g., all non-VPN network topology information or all VPN network topology information), even when a refresh is only needed for a subset of the network topology information. This causes unnecessary churn and communication overhead. Embodiments described herein overcome the disadvantages of prior techniques by providing a route refresh mechanism which allows for selective refresh of network topology information to refresh a subset of the network topology information. Embodiments achieve this by providing an advanced route refresh message that extends the standard ROUTE-REFRESH message with additional parameters such as route distinguisher (for VPN network topology information), autonomous system (AS) number, LS-ID, protocol, instance identifier, and network layer reachability information (NLRI) type, in addition to AFI and SAFI. A BGP speaker may specify parameter values in the advanced route refresh message to refresh a subset of network topology information.

FIG. 1 is a block diagram illustrating a network in which selective route refresh for BGP-LS can be implemented, according to some embodiments. In the illustrated embodiment, the network 100 includes four ASes (AS1, AS2, AS3, and AS4). Each AS includes a set of network devices 110 (e.g., routers) that are typically under a single technical administration. AS1 includes network devices 110A-C. AS2 includes network devices 110D-G. AS3 includes network devices 110H-J. AS4 includes network devices 110K-M. The network devices 110 within each AS may run an interior gateway protocol (IGP) to exchange network topology information with other network devices 110 within the AS. In some embodiments, the network devices 110 may run more than one IGP within the AS. Also, the network devices 110 may run more than one instance of a given IGP.

BGP-LS allows network topology information collected within an AS (e.g., through running an IGP) to be shared with other ASes using BGP. For example, network device 110E in AS2 may implement BGP-LS to obtain AS3 network topology information and AS4 network topology information. Network device 110E may then share this network topology information (and AS2 network topology information learned from running an IGP within AS2) with network device 110B in AS1. Network topology information in BGP-LS can be identified based on route distinguisher (for VPN network topology information), AS number, LS-ID, protocol, instance identifier, NLRI type, and other parameters. BGP-LS is described in the Internet Engineering Task Force (IETF) Internet-Draft draft-ietf-idr-ls-distribution-11, entitled "North-Bound Distribution of Link-State and TE Information using BGP," which is incorporated herein in its entirety by reference.

Network device 110B may transmit a BGP ROUTE-REFRESH message (e.g., as described in the IETF Request for Comments (RFC) 2918 and/or in the IETF RFC 7313, both of which are hereby incorporated in their entireties by reference) to a network device 110E to request a refresh of network topology information. A refresh of network topology information may be needed, for example, if a routing policy of a peer changes or to validate consistency of routes. The existing BGP ROUTE-REFRESH message includes a field for an AFI and a field for a SAFI. As such, network device 110B can only request a refresh of network topology information for a given AFI and SAFI if using the existing BGP ROUTE-REFRESH message. This may cause unnecessary churn and overhead, particularly when network device 110B only needs to refresh a subset of the network topology information within an AFI and SAFI.

Embodiments described herein provide an advanced route refresh message that extends the standard BGP ROUTE-REFRESH message with additional parameters such as route distinguisher (for VPN network topology information), AS number, LS-ID, protocol, instance identifier, and NLRI type, in addition to AFI and SAFI. The advanced route refresh message allows network device 110B to request refresh of a subset of network topology information (i.e., at a more granular level than the level provided by AFI and SAFI) from network device 110E. Network device 110B may request a refresh of a subset of the network topology information by specifying values for one or more of the parameters in the advanced route refresh message, as desired, and by transmitting the advanced route refresh message to network device 110E. When network device 110E receives the advanced route refresh message, network device 110E determines the subset of network topology information, for example, from network topology information stored in its network topology database (e.g., adj-RIB-out), that matches the parameters in the advanced route refresh message and transmits this subset of network topology information to network device 110B. In this way, network device 110B can refresh network topology information at a finer granularity than the granularity provided by AFI and SAFI, which reduces churn and communication overhead compared to transmitting all network topology information for a given AFI and SAFI. An exemplary message format for an advanced route refresh message is described herein below with reference to FIGS. 2A-2E.

Figure 2A:
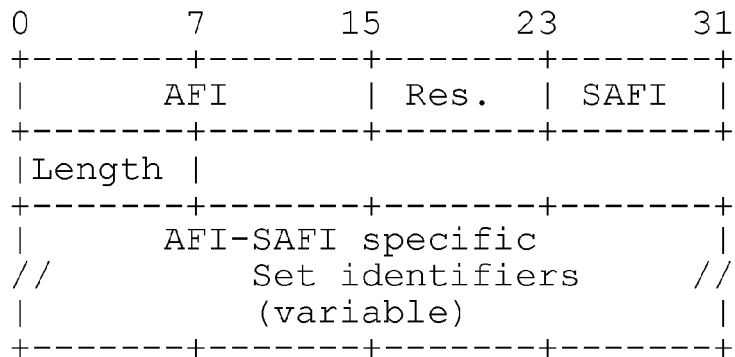
FIG. 2A illustrates a message format for an advanced route refresh message, according to some embodiments.

FIG. 2A illustrates a message format for an advanced route refresh message, according to some embodiments. The advanced route refresh message includes an AFI field, a reserved (Res.) field, and a SAFI field. The meaning and use of these fields are the same as those defined in the IETF RFC 2918. As shown, the AFI field is 16 bits long and is used to specify an AFI. The reserved field is 8 bits long and should be set to 0 by the sender and may be ignored by the receiver. The SAFI field is 8 bits long and is used to specify a SAFI. The advanced route refresh message also includes a length field and a field for AFI-SAFI specific set identifiers. The length field is 8 bits long and is used to specify the number of AFI-SAFI specific set identifiers in the AFI-SAFI specific set identifiers field. The AFI-SAFI specific set identifiers fields is variable in length and is used to specify AFI-SAFI specific set identifiers. An AFI-SAFI specific set identifier identifies a subset of network topology information within the AFI and the SAFI specified in the AFI field and SAFI field. Each AFI-SAFI specific set identifier could be a SAFI-71 set identifier or a SAFI-VPN set identifier. A SAFI-71 set identifier is used for identifying non-VPN network topology information. A SAFI-VPN set identifier is used for identifying VPN-specific network topology information. Exemplary formats for a SAFI-71 set identifier and a SAFI-VPN set identifier are described in additional detail below. A value of 0 in the length field is valid and indicates that all network topology information matching the specified AFI-SAFI should be refreshed.

The advanced route refresh message is fully compatible with existing BGP route refresh procedures, as the advanced route refresh message takes the standard BGP ROUTE-REFRESH format and appends additional fields such as the length field and the AFI-SAFI specific set identifiers field. A BGP speaker that does not support advanced route refresh who receives an advanced route refresh message can interpret the advanced route refresh message as a standard BGP ROUTE-REFRESH message and ignore the additional fields. This will initiate route refresh of network topology information for the entire AFI and SAFI specified in the message.

Figure 2B:
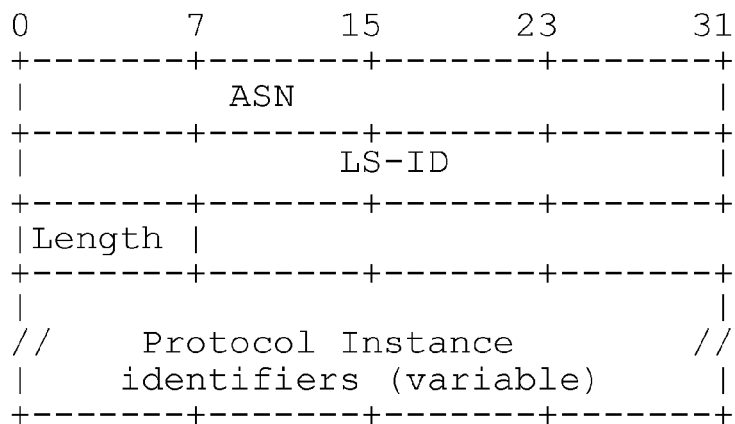
FIG. 2B illustrates a format for a SAFI-71 set identifier, according to some embodiments.

FIG. 2B illustrates a format for a SAFI-71 set identifier, according to some embodiments. The SAFI-71 set identifier includes an AS number (ASN) field, an LS-ID field, a length field, and a field for protocol instance identifiers. As shown, the AS number field is 32 bits long and is used to specify an AS number. The LS-ID field is 32 bits long and is used to specify an LS-ID. In BGP-LS, an AS number in conjunction with an LS-ID is used to uniquely identify a BGP-LS domain. The length field is 8 bits long and is used to specify the number of protocol instance identifiers in the protocol instance identifiers field. The protocol instance identifiers field is variable in length and is used to specify protocol instance identifiers. A protocol instance identifier identifies a subset of network topology information within the AS number and the LS-ID specified in the AS number field and LS-ID field. An exemplary format for a protocol instance identifier is described in additional detail below. A value of 0 in the length field is valid and indicates that all network topology information matching the specified AFI-SAFI, AS number, and LS-ID should be refreshed.

Figure 2C:
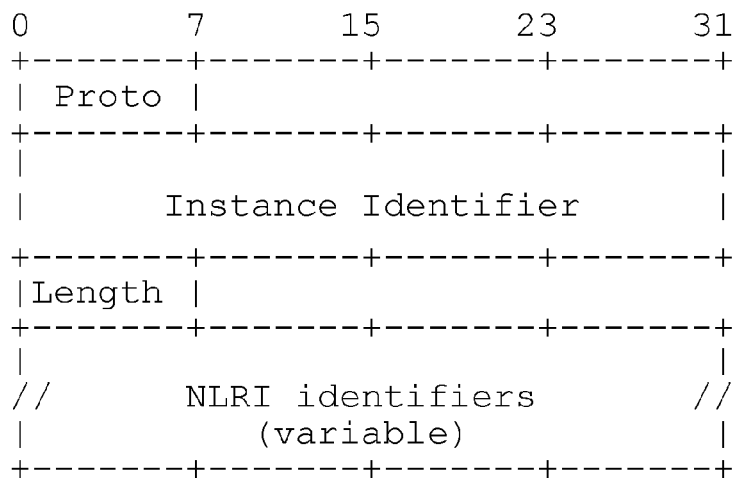
FIG. 2C illustrates a format for a protocol instance identifier, according to some embodiments.

FIG. 2C illustrates a format for a protocol instance identifier, according to some embodiments. The protocol instance identifier includes a protocol (proto) field, an instance identifier field, a length field, and a field for NLRI identifiers. As shown, the protocol field is 8 bits long and is used to specify the routing protocol. For example, the value in the protocol field can indicate a specific routing protocol (e.g., an IGP) such as IS-IS Level 1, IS-IS Level 2, OSPFv2, or OSPFv3. The instance identifier field is 64 bits long and is used to specify an instance identifier. Some protocols such as OSPF and IS-IS may run multiple routing protocol instances over the same link. The instance identifier field is used to distinguish between instances of the same routing protocol. The length field is 8 bits long and is used to specify the number of NLRI identifiers in the NLRI identifiers field. The NLRI identifiers field is variable in length and is used to specify NLRI identifiers. An NLRI identifier identifies a subset of network topology information within the protocol and the instance identifier specified in the protocol field and the instance identifier field. An exemplary format for an NLRI identifier is described in additional detail below. A value of 0 in the length field is valid and indicates that all network topology information matching the specified AFI-SAFI, AS number, LS-ID, protocol, and instance identifier should be refreshed.

FIG. 2D illustrates a format for an NLRI identifier and possible values for NLRI type, according to some embodiments. The NLRI identifier includes an NLRI type field. As shown, the NLRI type field is 16 bits long and is used to specify an NLRI type. In one embodiment, the value in the NLRI type field can indicate a node NLRI, a link NLRI, an Internet Protocol version 4 (IPv4) topology prefix NLRI, or an Internet Protocol version 6 (IPv6) topology prefix NLRI. If the NLRI type is specified, this indicates that all network topology information matching the specified AFI-SAFI, AS number, LS-ID, protocol, instance identifier, and the specified NLRI type should be refreshed.

FIG. 2E illustrates a format for a SAFI-VPN set identifier, according to some embodiments. The SAFI-VPN set identifier includes a route distinguisher field, a length field, and a field for SAFI-71 set identifiers. As shown, the route distinguisher field is 32 bits long and is used to specify a route distinguisher. A route distinguisher is typically used to uniquely identify a VPN. The length field is 8 bits long and is used to specify the number of SAFI-71 identifiers in the SAFI-71 set identifiers field. The SAFI-71 set identifiers field is variable in length and is used to specify SAFI-71 set identifiers. Within a SAFI-VPN identifier, a SAFI-71 set identifier identifies a subset of network topology information within the route distinguisher specified in the route distinguisher field. SAFI-71 set identifiers can be specified in this field using the format described with reference to FIG. 2B or a similar format. A value of 0 in the length field is valid and indicates that all network topology information matching the specified AFI-SAFI and route distinguisher should be refreshed.

Table 1 below summarizes the parameters that can be specified in the advanced route refresh message (in addition to AFI and SAFI) and the corresponding response when such an advanced route refresh message is received:

| Parameters Specified | Response |
| --- | --- |
| (1) Route distinguisher (RD) | Provide refresh for all AS number and LS-ID matching specified RD and all protocol and instances therein and all NLRI types therein |
| (2) RD* + AS Number (ASN) + LS-ID | Refresh all protocol and instances matching specified ASN and LS-ID and all NLRI types therein |
| (3) RD* + ASN + LS-ID + Protocol + Instance ID | Provide refresh for all NLRI types matching specified ASN, LS-ID, protocol, and instance ID |
| (4) RD* + ASN + LS-ID + Protocol + Instance ID + NLRI type | Provide refresh for all network topology information matching specified ASN, LS-ID, protocol, instance ID, and NLRI type |

The first column indicates the parameters specified in an advanced route refresh message, while the second column indicates the corresponding response by the BGP speaker that receives the advanced route refresh message (i.e., the responding BGP speaker). As indicated in row 1 of the table, if the advanced route refresh message specifies a route distinguisher, then the responding BGP speaker provides a refresh of all network topology information matching the given route distinguisher (all AS numbers (ASN) and LS-ID matching the specified route distinguisher and all protocol and instances therein and all NLRI types therein). The route distinguisher is only applicable for SAFI-VPN. In one embodiment, a route distinguisher must be provided for SAFI-VPN but should not be provided for SAFI-71 (non-VPN). The route distinguisher is denoted with an asterisk ("*") in rows 2-4 of the table to indicate that the route distinguisher may not be present (e.g., for SAFI-71 (non- VPN network topology information)). As indicated in row 2 of the table, if the advanced route refresh message specifies an AS number and a LS-ID, then the responding BGP speaker provides a refresh of all network topology information matching these specified parameters (all protocols and instances matching specified ASN and LS-ID and all NLRI types therein). As indicated in row 3 of the table, if the advanced route refresh message specifies an AS number, an LS-ID, a protocol, and an instance identifier, then the responding BGP speaker provides a refresh of all network topology information matching these specified parameters (all NLRI types matching specified ASN, LS-ID, protocol, and instance identifier). As indicated in row 4 of the table, if the advanced route refresh message specifies an AS number, an LS-ID, a protocol, an instance identifier, and an NLRI type, then the responding BGP speaker provides a refresh of all network topology information matching these specified parameters (all network topology information (e.g., NLRIs) matching the specified ASN, LS-ID, protocol, instance identifier, and NLRI type).

If the responding BGP speaker does not support BGP-LS, then the responding BGP speaker provides a refresh of all network topology information for the specified AFI/SAFI, as done in legacy BGP route refresh. Embodiments described herein provide a hierarchical way of specifying the desired subset of network topology information, starting with AFI and SAFI at the highest (broadest) level followed by AS number and LS-ID, protocol and instance identifier, and NLRI type in decreasing order (becoming more specific). It should be noted that the various parameters and hierarchy of parameters are provided by way of example and not limitation. In other embodiments, the advanced route refresh message may employ different types of parameters and a different hierarchy structure (or even a non-hierarchical structure) for the parameters. Moreover, it should be noted that the message format for the advanced route refresh message described with reference to FIGS. 2A-E is provided by way of example and not limitation. In other embodiments, the advanced route refresh message may employ a different message format than described above.

Figure 3:
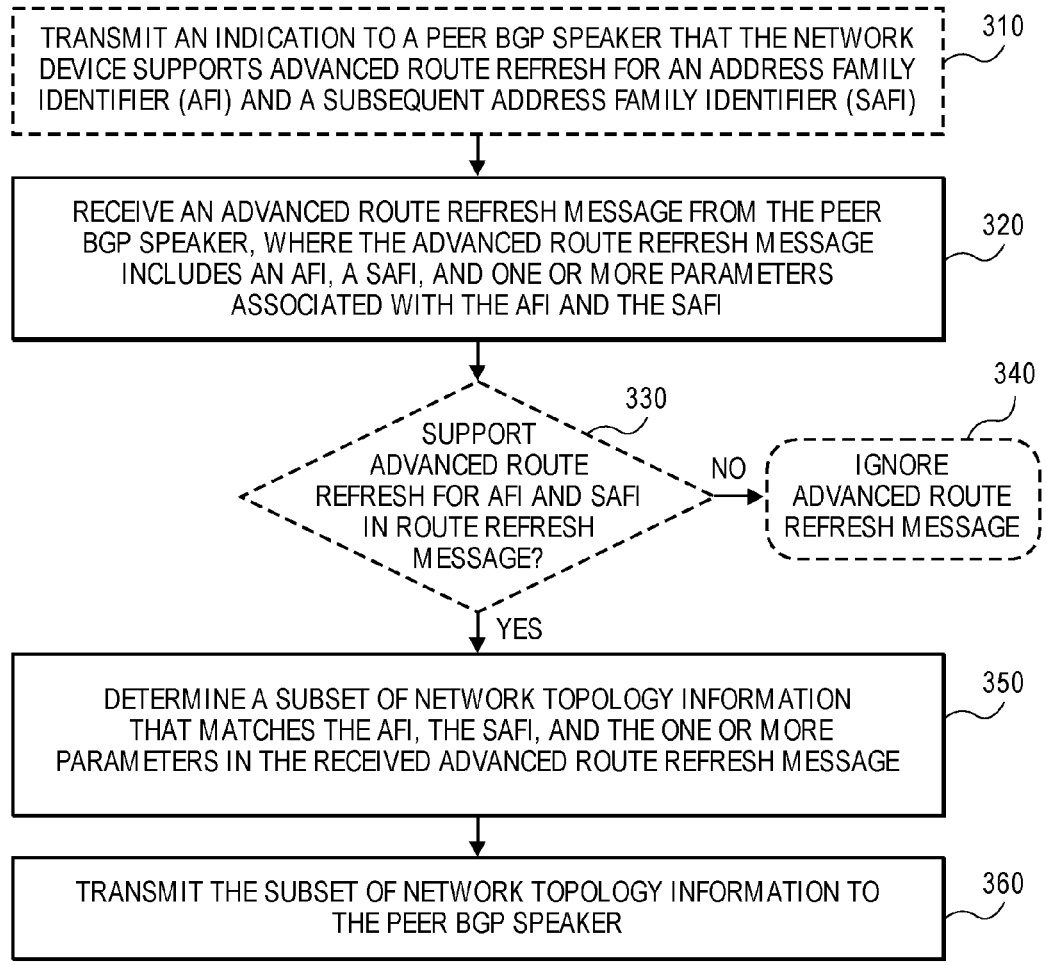
FIG. 3 is a flow diagram of a process for providing selective route refresh in BGP-LS, according to some embodiments.

FIG. 3 is a flow diagram of a process for providing selective route refresh in BGP-LS, according to some embodiments. In one embodiment, the operations of the flow diagram may be performed by a network device (e.g., network device 110) in a network (e.g., network 100) that acts as a BGP speaker. The operations in this flow diagram will be described with reference to the exemplary embodiments of the other figures. However, it should be understood that the operations of the flow diagram can be performed by embodiments other than those discussed with reference to the other figures, and the embodiments discussed with reference to these other figures can perform operations different than those discussed with reference to the flow diagram.

In one embodiment, the network device 110 may establish a BGP session with a peer BGP speaker. At BGP session establishment with the peer BGP speaker, the network device 110 may transmit an indication to the peer BGP speaker that the network device 110 supports advanced route refresh for an address family identifier (AFI) and a subsequent address family identifier (SAFI) (block 310). In one embodiment, this indication is transmitted using BGP capabilities advertisement (e.g., as described in IETF RFC 2842, which is hereby incorporated in its entirety by reference). Advertising advanced route refresh capability for an AFI and a SAFI to the peer BGP speaker conveys to the peer BGP speaker that the network device 110 can provide a refresh of a subset of network topology information within the AFI and the SAFI.

After the network device 110 establishes a BGP session with the peer BGP speaker, the network device 110 receives an advanced route refresh message from the peer BGP speaker (block 320). The advanced route refresh message includes an AFI, a SAFI, and one or more parameters associated with the AFI and the SAFI. The advanced route refresh message is a message from the peer BGP speaker requesting a refresh of a subset of network topology information within the AFI and the SAFI. The one or more parameters associated with the AFI and the SAFI indicate the subset of network topology information within the AFI and the SAFI that the peer BGP speaker desires to have refreshed. The one or more parameters may include a route distinguisher, an AS number, a LS-ID, a protocol, an instance identifier, and NLRI type. In one embodiment, the advanced route refresh message has a message format as described above with reference to FIGS. 2A-E or similar format.

In one embodiment, if the network device 110 does not support advanced route refresh for the AFI and the SAFI in the advanced route refresh message (checked at block 330), then the network device 110 ignores the advanced route refresh message (block 340). For example, if the network device 110 receives an advanced route refresh message from the peer BGP speaker that specifies an AFI and SAFI that the network device 110 did not previously advertise to the BGP speaker (e.g., via BGP capabilities advertisement), then the network device 110 may ignore that advanced route refresh message.

If the network device 110 supports advanced route refresh for the AFI and the SAFI specified in the advanced route refresh message, then the network device 110 determines a subset of network topology information (e.g., from network topology information stored at, or accessible by, the network device 110) that matches the AFI, the SAFI, and the one or more parameters in the received advanced route refresh message (block 350). In one embodiment, the network device 110 stores network topology information in a network topology information database (e.g., adj-RIB-out). The network device 110 may determine the subset of network topology information by submitting a query for network topology information (e.g., from network topology information stored in the network topology information database) that matches the AFI, the SAFI, and the other parameters in the advanced route refresh message. In one embodiment, the network device 110 may further filter the query results based on an outbound route filtering policy.

The network device 110 then transmits the subset of network topology information to the peer BGP speaker (block 360). In this way, the network device 110 is able to provide a refresh of a subset of the network topology information to the peer BGP speaker, according to the parameters specified by the peer BGP speaker in the advanced route refresh message.

Figure 4:
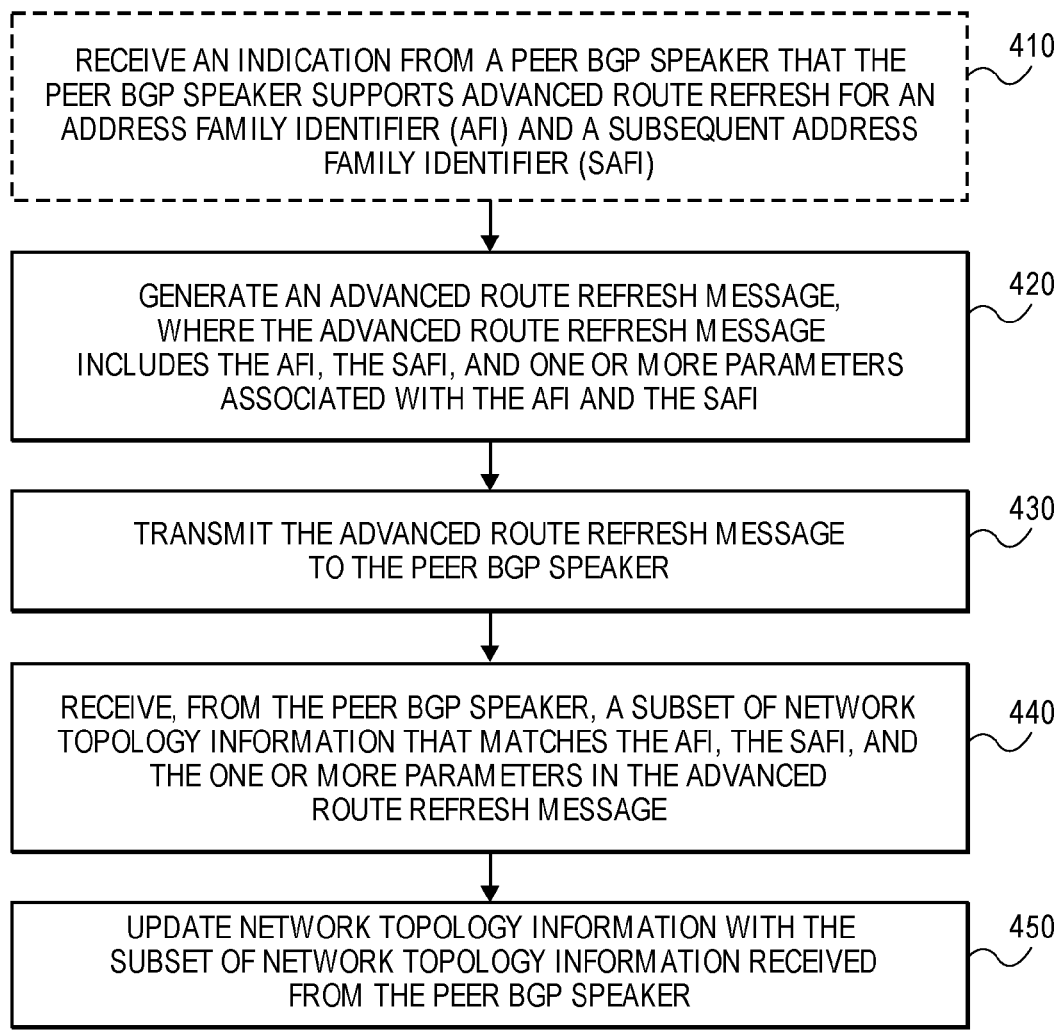
FIG. 4 is a flow diagram of a process for requesting selective route refresh in BGP-LS, according to some embodiments.

FIG. 4 is a flow diagram of a process for requesting selective route refresh in BGP-LS, according to some embodiments. In one embodiment, the operations of the flow diagram may be performed by a network device (e.g., network device 110) in a network (e.g., network 100) that acts as a BGP speaker. The operations in this flow diagram will be described with reference to the exemplary embodiments of the other figures. However, it should be understood that the operations of the flow diagram can be performed by embodiments other than those discussed with reference to the other figures, and the embodiments discussed with reference to these other figures can perform operations different than those discussed with reference to the flow diagram.

In one embodiment, the network device 110 may establish a BGP session with a peer BGP speaker. At BGP session establishment with the peer BGP speaker, the network device 110 may receive an indication from the peer BGP speaker that the peer BGP speaker supports advanced route refresh for an address family identifier (AFI) and a subsequent address family identifier (SAFI) (block 410). In one embodiment, this indication is received using BGP capabilities advertisement. Receiving an indication from the peer BGP speaker that the peer BGP speaker supports advanced route refresh capability for an AFI and a SAFI conveys that the peer BGP speaker can provide a refresh for a subset of network topology information within the AFI and the SAFI. Thus, the network device 110 may transmit an advanced route refresh message to the peer BGP speaker to request a refresh of a subset of network topology information within an AFI and a SAFI. In one embodiment, the network device 110 may only send an advanced route refresh message with an AFI and a SAFI to the peer BGP speaker if the network device 110 has received an indication from the peer BGP speaker that the peer BGP speaker supports advanced route refresh for the AFI and the SAFI (e.g., via a BGP capabilities advertisement).

After the network device 110 establishes a BGP session with the peer BGP speaker, the network device 110 generates an advanced route refresh message (block 420). The advanced route refresh message includes an AFI, a SAFI, and one or more parameters associated with the AFI and SAFI. The advanced route refresh message is used to request a refresh of a subset of network topology information within the AFI and the SAFI. The one or more parameters associated with the AFI and the SAFI indicate the subset of network topology information within the AFI and the SAFI that the network device 110 desires to have refreshed. The one or more parameters may include route distinguisher, AS number, LS-ID, protocol, instance identifier, and NLRI type. In one embodiment, the advanced route refresh message has a message format as described above with reference to FIGS. 2A-E or similar format.

The network device 110 transmits the advanced route refresh message to the peer BGP speaker (block 430). The network device 110 then receives, from the peer BGP speaker, a subset of network topology information (e.g., from network topology information stored at, or accessible by, the peer BGP speaker) that matches the AFI, the SAFI, and the one or more parameters in the advanced route refresh message (block 440).

The network device 110 then updates network topology information, for example, its network topology information stored in a database, with the subset of network topology information received from the peer BGP speaker (block 450). In this way, the network device 110 is able to request a refresh of a subset of network topology information by specifying one or more parameters as desired in the advanced route refresh message.

In one embodiment, a network device 110 may augment embodiments of the advanced route refresh techniques described herein with features of the Enhanced Route Refresh Capability for BGP described in IETF RFC 7313, which is incorporated herein in its entirety by reference. These features may enhance route refresh techniques to provide for the demarcation of the beginning and the ending of a route refresh. The enhancement can be used to facilitate correction of network topology information in a non-disruptive manner.

The advanced route refresh techniques described herein may be applied in the context of Ethernet Virtual Private Networks (eVPN) to refresh a subset of network topology information at a finer granularity than AFI/SAFI. More generally, the advanced route refresh techniques described herein is applicable to any type of network technology that relies on BGP to exchange network topology information.

Figure 5A:
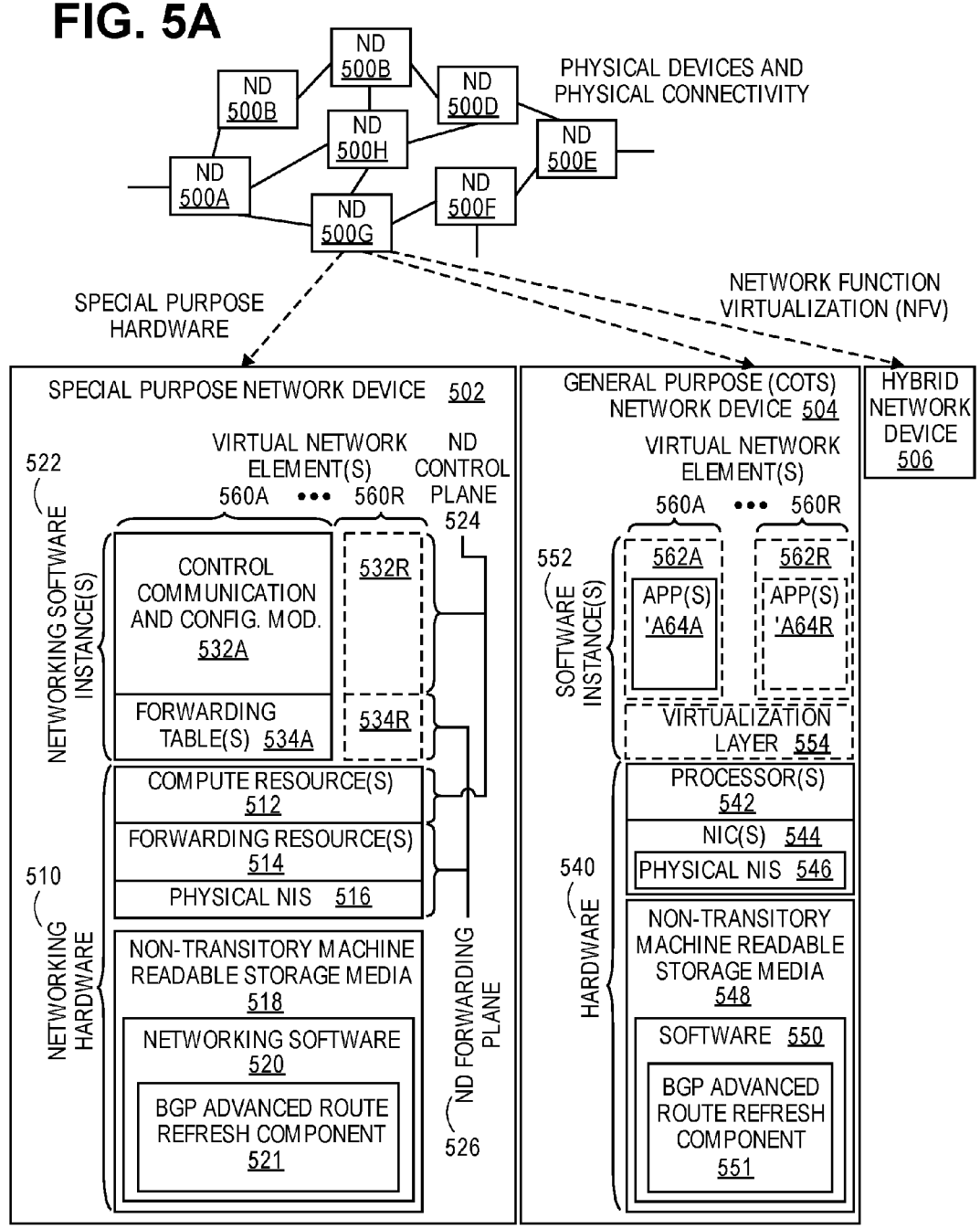
FIG. 5A illustrates connectivity between network devices (NDs) within an exemplary network, as well as three exemplary implementations of the NDs, according to some embodiments.

FIG. 5A illustrates connectivity between network devices (NDs) within an exemplary network, as well as three exemplary implementations of the NDs, according to some embodiments. FIG. 5A shows NDs 500A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 500A, E, and F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a proprietary operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

Software 520 can include a BGP advanced route refresh component 521, which when executed by networking hardware 510, causes networking hardware 510 to perform operations of one or more embodiments of the present invention as part networking software instances 522.

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

Figure 5B:
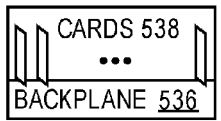
FIG. 5B illustrates an exemplary way to implement a special-purpose network device according to some embodiments.

FIG. 5B illustrates an exemplary way to implement the special-purpose network device 502 according to some embodiments. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. During operation, the processor(s) 542 execute the software 550 to instantiate one or more sets of one or more applications 564A-R. While one embodiment does not implement virtualization, alternative embodiments may use different forms of virtualization—represented by a virtualization layer 554 and software containers 562A-R. For example, one such alternative embodiment implements operating system-level virtualization, in which case the virtualization layer 554 represents the kernel of an operating system (or a shim executing on a base operating system) that allows for the creation of multiple software containers 562A-R that may each be used to execute one of the sets of applications 564A-R. In this embodiment, the multiple software containers 562A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 554 represents a hypervisor (sometimes referred to as a virtual machine monitor (VMM)) or a hypervisor executing on top of a host operating system; and 2) the software containers 562A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 564A-R, as well as the virtualization layer 554 and software containers 562A-R if implemented, are collectively referred to as software instance(s) 552. Each set of applications 564A-R, corresponding software container 562A-R if implemented, and that part of the hardware 540 that executes them (be it hardware dedicated to that execution and/or time slices of hardware temporally shared by software containers 562A-R), forms a separate virtual network element(s) 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 562A-R differently. For example, while embodiments of the invention are illustrated with each software container 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 562A-R to VNEs also apply to embodiments where such a finer level of granularity is used.

In certain embodiments, the virtualization layer 554 includes a virtual switch that provides similar forwarding services as a physical Ethernet switch. Specifically, this virtual switch forwards traffic between software containers 562A-R and the NIC(s) 544, as well as optionally between the software containers 562A-R; in addition, this virtual switch may enforce network isolation between the VNEs 560A-R that by policy are not permitted to communicate with each other (e.g., by honoring virtual local area networks (VLANs)).

Software 550 can include a BGP advanced route refresh component 551, which when executed by processor(s) 542, cause processor(s) 542 to perform operations of one or more embodiments of the present invention as part software containers 562A-R.

The third exemplary ND implementation in FIG. 5A is a hybrid network device 506, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 5C:
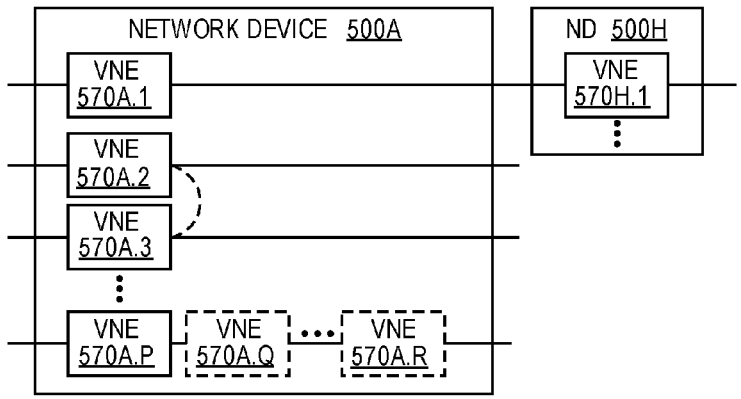
FIG. 5C illustrates various exemplary ways in which virtual network elements (VNEs) may be coupled according to some embodiments.

FIG. 5C illustrates various exemplary ways in which VNEs may be coupled according to some embodiments. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software containers 562A-R may operate as servers; the same would be true for the hybrid network device 506; in the case of the special-purpose network device 502, one or more such servers could also be run on a virtualization layer executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 5D:
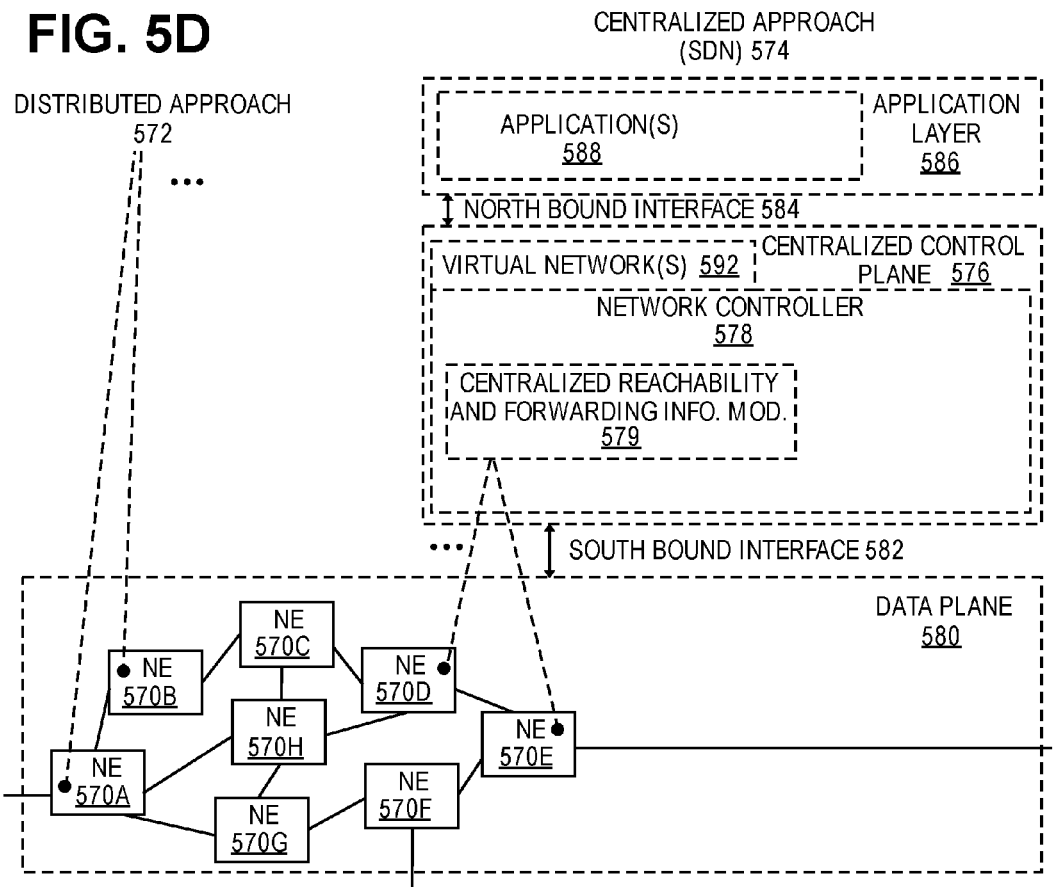
FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP), as well as RSVP-Traffic Engineering (TE): Extensions to RSVP for LSP Tunnels, Generalized Multi-Protocol Label Switching (GMPLS) Signaling RSVP-TE that communicate with other NEs to exchange routes, and then selects those routes based on one or more routing metrics. Thus, the NEs 570A-H (e.g., the compute resource(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
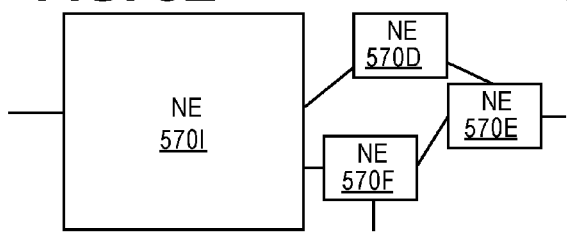
FIG. 5E illustrates the simple case of where each of the NDs implements a single NE, but a centralized control plane has abstracted multiple of the NEs in different NDs into (to represent) a single NE in one of the virtual network(s), according to some embodiments.
Figure 5F:
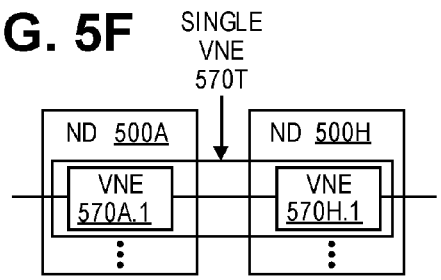
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments. FIG. 5E shows that in this virtual network, the NE 5701 is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments. Thus, the abstraction of a NE or VNE can span multiple NDs.

While some embodiments implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
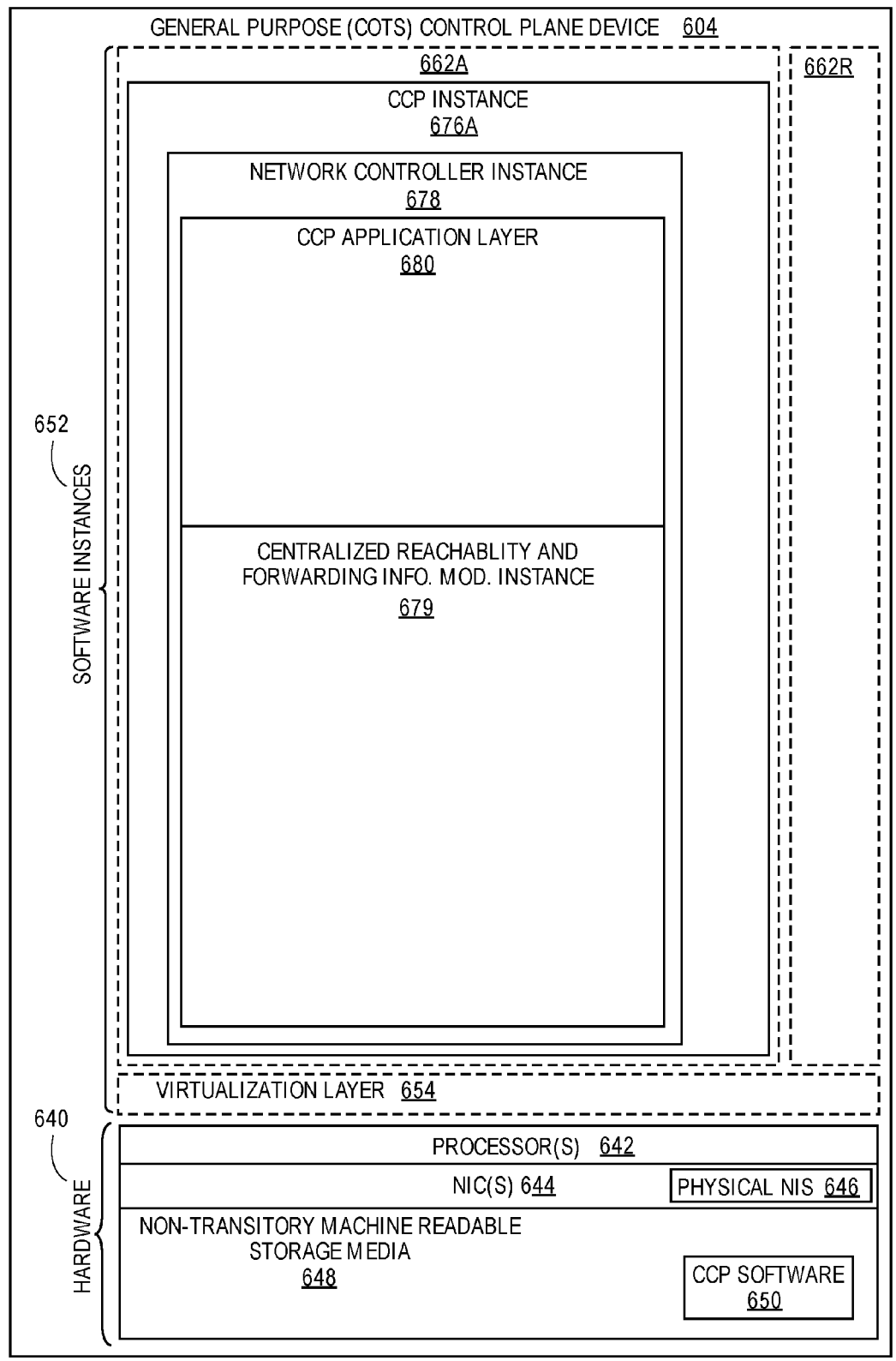
FIG. 6 illustrates a general purpose control plane device with centralized control plane (CCP) software, according to some embodiments.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein centralized control plane (CCP) software 650.

In embodiments that use compute virtualization, the processor(s) 642 typically execute software to instantiate a virtualization layer 654 and software container(s) 662A-R (e.g., with operating system-level virtualization, the virtualization layer 654 represents the kernel of an operating system (or a shim executing on a base operating system) that allows for the creation of multiple software containers 662A-R (representing separate user space instances and also called virtualization engines, virtual private servers, or jails) that may each be used to execute a set of one or more applications; with full virtualization, the virtualization layer 654 represents a hypervisor (sometimes referred to as a virtual machine monitor (VMM)) or a hypervisor executing on top of a host operating system, and the software containers 662A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 650 (illustrated as CCP instance 676A) is executed within the software container 662A on the virtualization layer 654. In embodiments where compute virtualization is not used, the CCP instance 676A on top of a host operating system is executed on the "bare metal" general purpose control plane device 604. The instantiation of the CCP instance 676A, as well as the virtualization layer 654 and software containers 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user-interfaces). At a more abstract level, this CCP application layer 680 within the centralized control plane 576 works with virtual network view(s) (logical view(s) of the network) and the middleware layer provides the conversion from the virtual networks to the physical view.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a network device acting as a border gateway protocol (BGP) speaker in a network including a plurality of network devices, the method to implement selective route refresh for BGP link state (BGP-LS) to reduce communication overhead in sharing network topology information with other BGP speakers in the network, the method comprising:
    receiving an advanced route refresh message from a peer BGP speaker, wherein the advanced route refresh message includes an address family identifier (AFI), a subsequent address family identifier (SAFI), and one or more parameters associated with the AFI and the SAFI, wherein the one or more parameters include an autonomous system (AS) number and a link state identifier (LS-ID) associated with the AFI and the SAFI;
    determining a subset of network topology information that matches the AFI, the SAFI, and the one or more parameters in the received advanced route refresh message; and
    transmitting the subset of network topology information to the peer BGP speaker.

2. The method of claim 1, wherein the one or more parameters further include a protocol instance identifier associated with the AS number and the LS-ID.

3. The method of claim 2, wherein the protocol instance identifier includes a protocol and an instance identifier.

4. The method of claim 2, wherein the one or more parameters further include a network layer reachability information (NLRI) identifier associated with the protocol instance identifier.

5. The method of claim 4, wherein the NLRI identifier includes an NLRI type.

6. The method of claim 1, wherein the one or more parameters include a route distinguisher (RD).

7. The method of claim 1, wherein determining the subset of network topology information comprises submitting a query for network topology information that matches the AFI, the SAFI, and the one or more parameters, and filtering a result of the query according to an outbound route filtering policy.

8. The method of claim 1, further comprising:
    generating another advanced route refresh message, wherein the another advanced route refresh message includes an AFI, a SAFI, and one or more parameters associated with the AFI and SAFI of the another advanced route refresh message;
    transmitting the another advanced route refresh message to another peer BGP speaker;
    receiving, from the another peer BGP speaker, another subset of network topology information that matches the AFI, the SAFI, and the one or more parameters in the another advanced route refresh message; and
    updating network topology information with the another subset of network topology information received from the another peer BGP speaker.

9. A network device configured to act as a border gateway protocol (BGP) speaker in a network including a plurality of network devices, the network device configured to implement selective route refresh for BGP link state (BGP-LS) to reduce communication overhead in sharing network topology information with other BGP speakers in the network, the network device comprising:
    a non-transitory machine-readable storage medium having stored therein a BGP advanced route refresh component; and
    a set of one or more processors coupled to the non-transitory machine-readable storage medium, the set of one or more processors configured to execute the BGP advanced route refresh component, the BGP advanced route refresh component configured to
        receive an advanced route refresh message from a peer BGP speaker, wherein the advanced route refresh message includes an address family identifier (AFI), a subsequent address family identifier (SAFI), and one or more parameters associated with the AFI and the SAFI, wherein the one or more parameters include an autonomous system (AS) number and a link state identifier (LS-ID) associated with the AFI and the SAFI,
        determine a subset of network topology information that matches the AFI, the SAFI, and the one or more parameters in the received advanced route refresh message, and
        transmit the subset of network topology information to the peer BGP speaker.

10. A non-transitory machine-readable storage medium having computer code stored therein, which when executed by a set of one or more processors of a network device acting as a border gateway protocol (BGP) speaker in a network, causes the network device to perform operations for implementing selective route refresh for BGP link state (BGP-LS) to reduce communication overhead in sharing network topology information with other BGP speakers in the network, the operations comprising:
    receiving an advanced route refresh message from a peer BGP speaker, wherein the advanced route refresh message includes an address family identifier (AFI), a subsequent address family identifier (SAFI), and one or more parameters associated with the AFI and the SAFI, wherein the one or more parameters include an autonomous system (AS) number and a link state identifier (LS-ID) associated with the AFI and the SAFI;
    determining a subset of network topology information that matches the AFI, the SAFI, and the one or more parameters in the received advanced route refresh message; and transmitting the subset of network topology information to the peer BGP speaker.

11. The non-transitory machine-readable storage medium of claim 10, wherein the one or more parameters further include a protocol instance identifier associated with the AS number and the LS-ID.

12. The non-transitory machine-readable storage medium of claim 11, wherein the protocol instance identifier includes a protocol and an instance identifier.

13. The non-transitory machine-readable storage medium of claim 11, wherein the one or more parameters further include a network layer reachability information (NLRI) identifier associated with the protocol instance identifier.

14. The non-transitory machine-readable storage medium of claim 13, wherein the NLRI identifier includes an NLRI type.

15. The non-transitory machine-readable storage medium of claim 10, wherein the one or more parameters include a route distinguisher (RD).

16. The non-transitory machine-readable storage medium of claim 10, wherein determining the subset of network topology information comprises submitting a query for network topology information that matches the AFI, the SAFI, and the one or more parameters, and filtering a result of the query according to an outbound route filtering policy.

17. The non-transitory machine-readable storage medium of claim 10, wherein the computer code, when executed by the set of one or more processors, causes the network device to perform further operations comprising:
  generating another advanced route refresh message, wherein the another advanced route refresh message includes an AFI, a SAFI, and one or more parameters associated with the AFI and SAFI of the another advanced route refresh message;
  transmitting the another advanced route refresh message to another peer BGP speaker;
  receiving, from the another peer BGP speaker, another subset of network topology information that matches the AFI, the SAFI, and the one or more parameters in the another advanced route refresh message; and
  updating network topology information with the another subset of network topology information received from the another peer BGP speaker.

* * * * *